US010296355B2

(12) United States Patent
Keyser

(10) Patent No.: US 10,296,355 B2
(45) Date of Patent: May 21, 2019

(54) METHOD FOR THE CONFIGURATION OF ELECTRONIC DEVICES, IN PARTICULAR FOR THE CONFIGURATION OF COMPONENTS OF AN ACCESS CONTROL SYSTEM

(71) Applicant: SKIDATA AG, Grödig/Salzburg (AT)

(72) Inventor: York Keyser, Salzburg (AT)

(73) Assignee: Skidata AG, Grödig/Salzburg (AT)

( * ) Notice: Subject to any disclaimer, the term of this patent is extended or adjusted under 35 U.S.C. 154(b) by 344 days.

(21) Appl. No.: 15/198,163

(22) Filed: Jun. 30, 2016

(65) Prior Publication Data
US 2017/0003979 A1 Jan. 5, 2017

(30) Foreign Application Priority Data

Jun. 30, 2015 (EP) .................................... 15174548

(51) Int. Cl.
H04L 9/30 (2006.01)
H04L 9/32 (2006.01)
G06F 12/14 (2006.01)
G06F 21/44 (2013.01)
G06F 21/60 (2013.01)
G06F 9/445 (2018.01)
(Continued)

(52) U.S. Cl.
CPC ............ *G06F 9/4411* (2013.01); *H04L 9/302* (2013.01); *H04L 9/3249* (2013.01); *H04L 63/06* (2013.01); *H04L 63/062* (2013.01); *H04L 63/083* (2013.01); *H04L 63/0853* (2013.01); *H04W 12/04* (2013.01); *H04W 12/06* (2013.01); *G06F 9/44505* (2013.01); *G06F 12/1408* (2013.01); *G06F 21/44* (2013.01); *G06F 21/60* (2013.01); *H04L 2209/80* (2013.01)

(58) Field of Classification Search
CPC .. G06F 12/1408; G06F 9/44505; G06F 21/60; G06F 21/44; G06F 9/4411; H04L 9/302; H04L 9/3249; H04L 63/06; H04L 63/062; H04L 63/083; H04L 63/0853; H04L 2209/80; H04W 12/04; H04W 12/06
USPC ......................... 713/1, 100, 193; 726/26, 16
See application file for complete search history.

(56) References Cited

U.S. PATENT DOCUMENTS

| 8,392,539 B1 * | 3/2013 | Chen ..................... G06F 9/4406 709/220 |
| 2005/0149204 A1 * | 7/2005 | Manchester ............ H04L 29/06 700/1 |

(Continued)

FOREIGN PATENT DOCUMENTS

EP 2 469 374 A1 6/2012

*Primary Examiner* — Ji H Bae
(74) *Attorney, Agent, or Firm* — Davis & Bujold PLLC; Michael J. Bujold

(57) ABSTRACT

As part of the method for the configuration of electronic devices and, in particular for the configuration of components of an access control system for persons or vehicles, a configuration device (1) is used which can be connected to the device (2) to be configured for the purpose of data communication. The device (2) has its own CPU, storage and software and comprises a Trusted Execution Environment (3) and can be connected by way of a further computer (4), via a secure network connection, to a server (5) comprising a Trusted Execution environment for the purpose of data communication.

8 Claims, 3 Drawing Sheets

(51) Int. Cl.
*H04L 29/06* (2006.01)
*H04W 12/04* (2009.01)
*H04W 12/06* (2009.01)
*G06F 9/4401* (2018.01)

(56) References Cited

U.S. PATENT DOCUMENTS

| | | | |
|---|---|---|---|
| 2005/0198221 A1* | 9/2005 | Manchester | H04L 41/0213 709/220 |
| 2007/0118745 A1 | 5/2007 | Buer | |
| 2008/0228963 A1* | 9/2008 | Hironaka | G06Q 10/06 710/36 |
| 2010/0162377 A1* | 6/2010 | Gonzalez | G06F 21/31 726/9 |
| 2010/0186076 A1* | 7/2010 | Ali | G06F 21/34 726/9 |

* cited by examiner

METHOD FOR THE CONFIGURATION OF ELECTRONIC DEVICES, IN PARTICULAR FOR THE CONFIGURATION OF COMPONENTS OF AN ACCESS CONTROL SYSTEM

This application claims priority from European patent application serial no. 15174548.6 filed Jun. 30, 2015.

FIELD OF THE INVENTION

The present invention relates to a method for the configuration of electronic devices and in particular for the configuration of components of an access control system for persons or vehicles.

BACKGROUND OF THE INVENTION

Access control systems known from the state of the art as a rule comprise a number of access control devices with a reading unit for reading the data required for checking the validity of an access control device and a locking device, which is actuated by an actuator controlled via a control in order to enable a person/a vehicle to enter or leave a building or an area. In addition access control devices comprise vending machines for access authorisations and/or pay stations for paying the fee due for using an access control system.

In order to install and configure a new component of such a system, it is known from the state of the art, to initially install on the device an operating system by means of a storage medium such as by means of an SD card.

As a rule this operating system is a general operating system, which is not adapted to the device to be installed. Therefore the IF configuration or the definition of important parameters and environmental variables such as of server addresses, must be carried out manually.

It is also known from the state of the art, following installation of the general operating system, to use a pre-configured USB stick, which is read out via a software (a so-called Bootstrap-loader) pre-installed on the device to be configured. By means of this software the required configuration parameters, e.g. time of day, date and environmental variables, are downloaded from the USB stick and installed in the operating system. Following this step a technician establishes a connection by means of a SSH network protocol between the device to be configured and a further device and creates a new password. When entering the new password errors may happen if for example, this password is not entered correctly. Moreover, the new password entered is usually not encrypted, which may give rise to security-critical situations.

In order to set an IP address via the Bootstrap loader, the MAC address (media access control address, i.e. the hardware address of the network adapter of the device to be configured) must be known, which is not always the case. Therefore a technician must log in on the device to be configured in order to perform the IP configuration if the MAC address is not known.

SUMMARY OF THE INVENTION

The present invention is based on the requirement to propose a method for the configuration of electronic devices and in particular for the configuration of components of an access control system for persons or vehicles, by which method when executed, the disadvantages known from the state of the art and mentioned above are avoided.

Accordingly a method is proposed for the configuration of electronic devices and in particular for the configuration of components of an access control system for persons or vehicles, as part of which a configuration device is used, which can be connected to the device to be configured, wherein the connection can be a corded or a cordless connection.

The configuration device is a device with its own CPU, storage means and software and it comprises a so-called Trusted Execution Environment, i.e. an area in the non-volatile memory and/or in the CPU, which can be accessed only by software especially activated for this reason, as a result of which a secure execution environment for this software is made available. A Trusted Execution environment of this kind has been developed, for example, by Messrs. ARM under the name of TrustZone.

The configuration device is preferably realised as a USB stick, but may also be a small computer with an external power supply.

The method according to the invention comprises the following steps:

Connecting the configuration device to the device to be configured for the purpose of data communication in a cordless manner or via a cable;

Performing mutual authentication;

Transferring a predefined configuration to the device to be configured, wherein the configuration comprises network settings and environmental variables and wherein an operator can monitor the procedure by means of an indicating device connectable to the configuration device and can manually carry out changes via an input device connectable to the configuration device;

Transferring, by means of the Trusted Execution Environment of the configuration device, a RSA key/crypto key, which complies with the current security standards, in order to allow access to the device to be configured via a SSH protocol and to verify the key by means of an encrypted connection between the configuration device and the device to be configured;

Reading-out or generating a password by means of the Trusted Execution Environment of the configuration device and transferring the same onto the device to be configured by means of an encrypted connection;

Checking the password by means of the encrypted connection and subsequently automatically inputting the password;

Creating a file containing all configuration information, for example IP and MAC addresses for documenting the configuration procedure, which file is then stored in the configuration device outside the Trusted Execution Environment, wherein this file does not contain any security-relevant information such as in particular the RSA key or a crypto key, which meets the current security standards and contains the password and serves as a reference for future configuration processes;

Establishing a connection for data communication between the configuration device and a further computer such as a notebook;

Establishing a secure network connection via the other computer to a server, which connection may e.g. be a VPN connection;

Performing mutual authentication between the configuration device and the server;

Transferring the password, the RSA key/the crypto key complying with the current security standards and further predefined important parameters via the Trusted Execution Environment of the configuration device to a Trusted Execution Environment on the server via the secure network connection;

Verifying the completeness of the transfer of the password, the RSA key and the further important parameters; and After transfer is complete, erasing the password, the RSA key/the crypto key complying with the current security standards and of the further important parameters stored in the configuration device, by means of the Trusted Execution Environment.

According to the invention authentication between the configuration device and the device to be configured is preferably carried out by means of PGP encryption, wherein, to this end, each device needs a key. The respective key of the configuration device is created in such a way that after a predefined period of time, it loses its validity and is stored in the configuration device by means of the Trusted Execution environment.

The RSA key/the crypto key complying with the current security standards serves to provide access to the device to be configured via an SSH protocol, in particular in the case that the password cannot be entered or its validity cannot be checked.

Following authentication, in order to transfer a predefined configuration, an executable file is preferably transferred to a temporary memory of the device to be configured, wherein the command for executing the executable file is entered via the configuration device by means of a SSH network protocol via an emulated Ethernet port.

The RSA key/the crypto key complying with the current security standards can be generated during the configuration procedure by means of the Trusted Execution environment of the configuration device or may be a key stored by means of the Trusted Execution environment. At the end of the configuration procedure all files with the exception of the file containing all configuration information are erased from the configuration device after they have been transferred to the server.

Due to the inventive conception installation is carried out in a simple way, wherein the password and further security-relevant parameters are not known to the operator. Further the password, the RSA key/the crypto key complying with the current security standards and further predefined parameters are protected against access by unauthorised persons.

BRIEF DESCRIPTION OF THE DRAWINGS

The invention will now be explained in detail by way of the attached figures, in which.

DETAILED DESCRIPTION OF THE PREFERRED EMBODIMENTS

Figure 1:
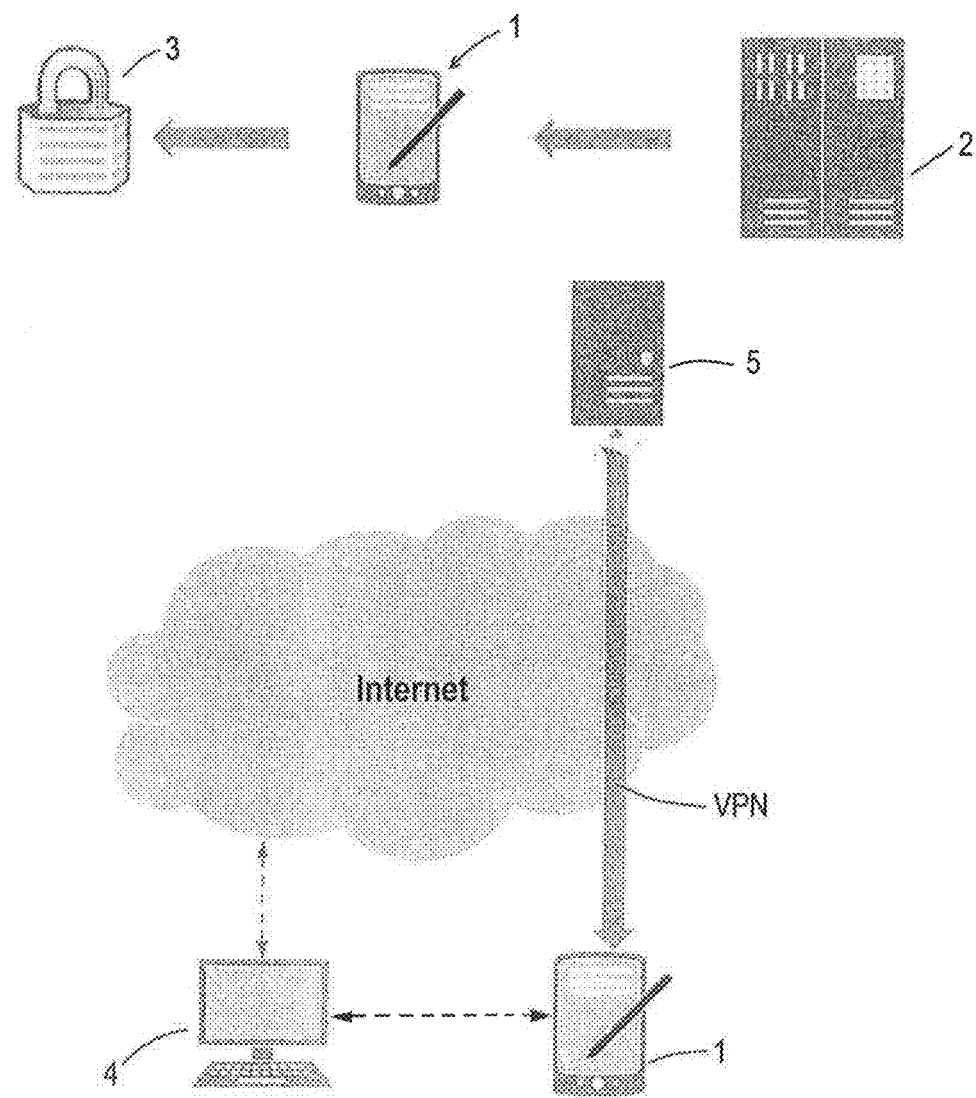
FIG. 1 shows a schematic diagram of the components needed for performing the method.

According to the invention and with reference to FIG. 1 a configuration device 1 is used for performing the method, which can be connected to the device 2 to be configured, which in the example shown is realised as a vending machine, wherein the connection may be corded or cordless, e.g. via WLAN.

The configuration device 1 has its own CPU, storage means and software and comprises a so-called Trusted Execution environment 3. Further, the configuration device 1 can, by means of a further computer 4, be connected via a secure network connection such as a VPN connection via the internet, to a server 5 comprising a Trusted Execution environment for the purpose of data communication.

Figure 2:
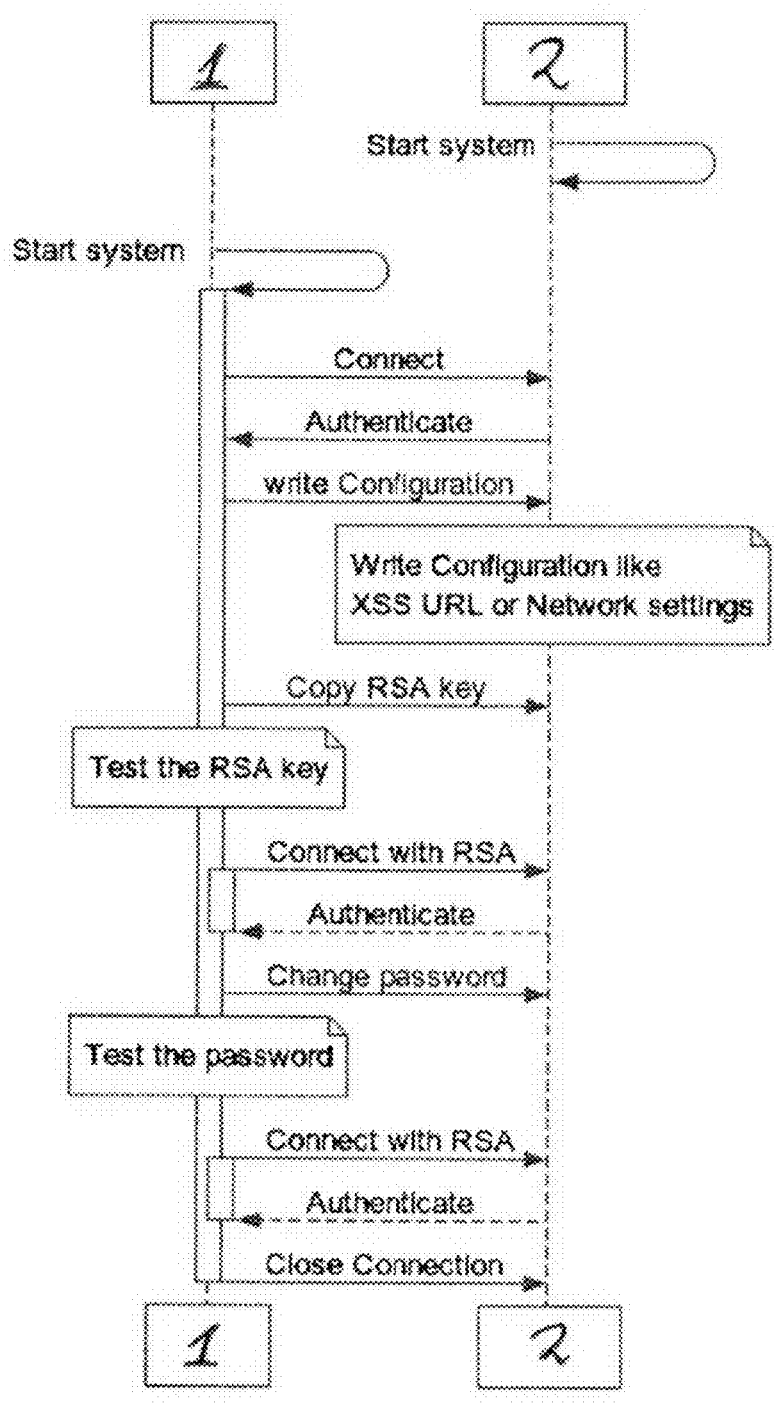
FIG. 2 shows a flow diagram for illustrating the steps of the method according to the invention when establishing the connection between the configuration device and a server.

At the start of the method for the configuration of electronic devices and in particular for the configuration of components of an access control system for persons or vehicles, the configuration device 1, after its start-up, is, as shown in FIG. 2, connected cordlessly or via a cable to the device 2 to be configured for the purpose of data communication, wherein subsequently mutual authentication, preferably by means of PGP encryption, is carried out and wherein following authentication by means of the Trusted Execution Environment 3 of the configuration device 1 a predefined configuration is transferred to the device 2 to be configured. The configuration comprises network settings and environmental variables; an operator can, by means of an indicating device connectable to the configuration device 1, monitor the procedure and can manually make changes via an input device connectable to the configuration device 1. During this process an IP address is issued without knowledge of the MAC address of the device 2 to be configured.

In a next step an RSA key is read out or generated via a SSH protocol by means of the Trusted Execution environment 3 of the configuration device 1 for permitting access to the device to be configured and transferred to the device 2 to be configured and subsequently verified, wherein subsequently, by means of the Trusted Execution environment 3 of the configuration device 1, a password is read out or generated, which is transferred to the device 2 to be configured by means of an encrypted connection and checked by means of an encrypted connection and an automatic input of the password.

In a next step a file containing all configuration information such as IP addresses and MAC addresses is created for documenting the configuration procedure and is stored outside the Trusted Execution Environment 3 in the configuration device 1, wherein following creation of the file, the connection between the configuration device 1 and the device 2 to be configured is terminated.

Figure 3:
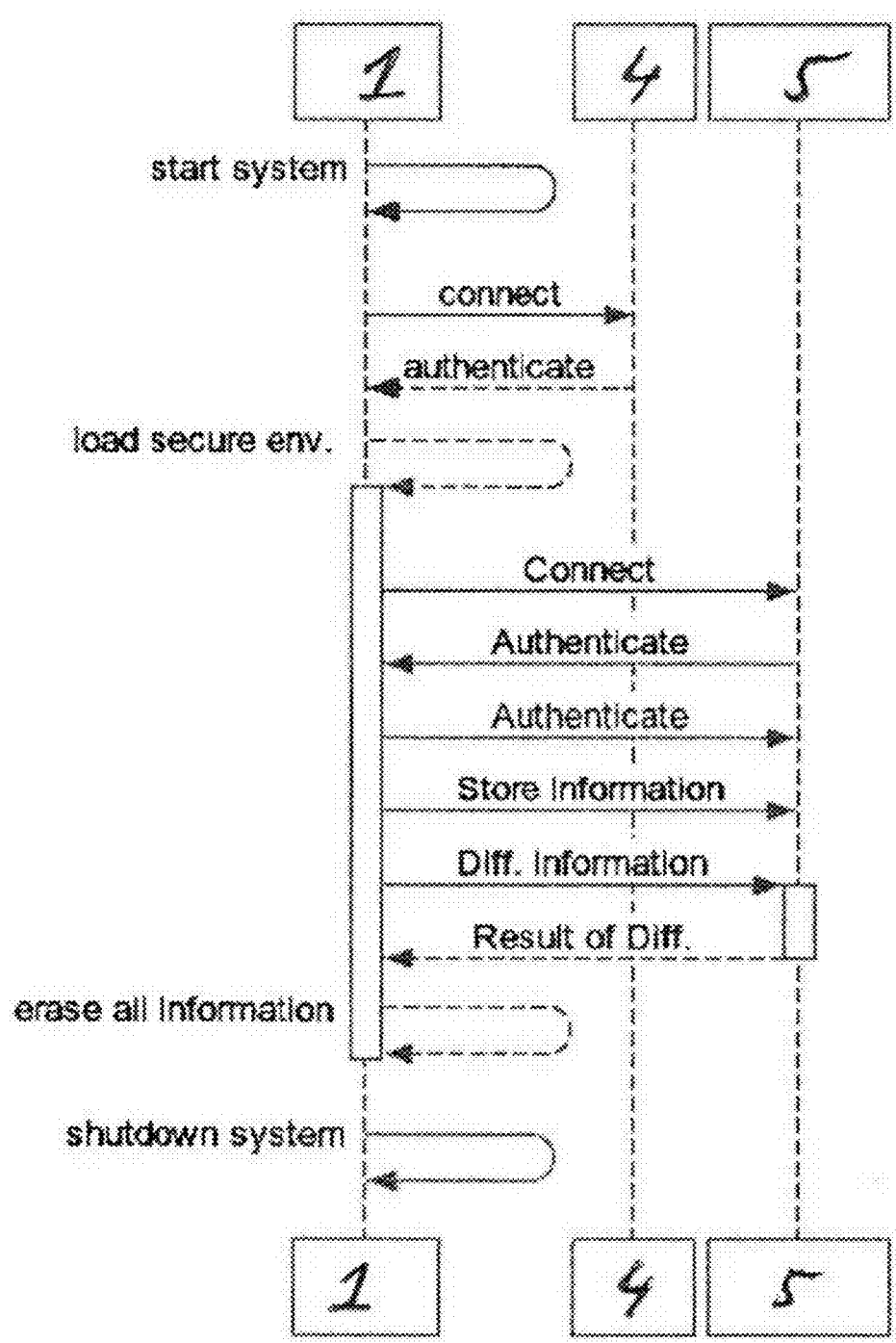
FIG. 3 shows a flow diagram for illustrating the steps of the method according to the invention when establishing the connection between the configuration device and a server.

Thereupon and with reference to FIG. 3 a connection for data communication is established between the configuration device 1 and a further computer 4, wherein following mutual authentication, a secure network connection to a server 5 is established via the other computer 4, und wherein following mutual authentication between the configuration device 1 and the server 5 the password, the RSA key and further predefined parameters are transferred by means of the Trusted Execution Environment 3 of the configuration device 1 to a Trusted Execution Environment on the server 5 via the secure network connection.

In a next step completeness of the transfer of the password, the RSA key and of further important parameters is verified, wherein following completion of transfer this data is erased in the configuration device 1. If the transfer is not complete the procedure is repeated until transfer is complete.

The method according to the invention is performed advantageously for the configuration of components of an access control system for persons or vehicles.

The invention claimed is:

1. A method for configuration of electronic devices and for the configuration of components of an access control system for persons or vehicles, wherein a configuration device (1) is used, which is connectable to a device (2) to be configured for the purpose of data communication, the configuration device comprising a CPU, a data storage medium and software and comprises a Trusted Execution Environment (3) and is connectable by a further computer (4), via a secure network connection, to a server (5) comprising a Trusted Execution Environment for the purpose of data communication, at the start of the method, connecting the configuration device (1) to the device (2) to be configured for the purpose of data communication followed by performing mutual authentication, following authentication by the Trusted Execution Environment (3) of the configuration device (1), transferring a predefined configuration to the device (2) to be configured, which comprises network settings and environmental variables, subsequently, by the Trusted Execution Environment (3) of the configuration device (1), either reading-out or generating a crypto key complying with security standards via a SSH protocol for permitting access to the device to be configured, transferring the crypto key to the device (2) to be configured and subsequently verifying the crypto key, in a next step, either reading-out or generating a password by the Trusted Execution Environment (3) of the configuration device (1), transferring the password by an encrypted connection to the device (2) to be configured and checking the password by an automatic input of the password, subsequently creating and storing a file containing all configuration information outside the Trusted Execution environment (3) in the configuration device (1), after creating the file, terminating the connection between the configuration device (1) and the device (2) to be configured, in a next step, establishing a connection for data communication between the configuration device (1) and the further computer (4), following mutual authentication, establishing secure network connection via the further computer (4) to a server (5), and following mutual authentication between the configuration device (1) and the server (5), transferring the password, the crypto key complying with the security standards, and predefined parameters by the Trusted Execution Environment (3) of the configuration device (1) to a Trusted Execution Environment on the server (5), via a secure network connection, and after completion of the transfer, erasing the password, the crypto key, and the predefined parameters from the configuration device (1).

2. The method according to claim 1, further comprising transferring an executable file to a temporary memory of the device (2) to be configured in order to transfer the predefined configuration to the device (2) to be configured, and entering a command for executing the executable file via the configuration device (1) by SSH network protocol via an emulated Ethernet port.

3. The method according to claim 1, further comprising effecting authentication between the configuration device (1) and the device (2) to be configured by PGP encryption, and creating the crypto key of the configuration device (1) such that the crypto key becomes invalid after a predefined period of time.

4. The method according to claim 1, further comprising configuring the configuration device (1) as a USB stick.

5. A method for configuration of at least one access control component of an access control system for persons or vehicles, wherein a configuration device (1) being connectable to the access control component for the purpose of data communication therebetween, the configuration device comprises a CPU, non-volatile storage medium, and software and comprises a Trusted Execution Environment (3), and the configuration device being connectable by a further computer (4), via a secure network connection, to a server (5) comprising a Trusted Execution Environment for purposes of data communication, the method comprising:

connecting the configuration device (1) to the access control component to facilitate data communication therebetween and then performing mutual authentication, following authentication by the Trusted Execution Environment (3) of the configuration device (1), transferring a predefined configuration to the access control component, which comprises network settings and environmental variables, subsequently, by the Trusted Execution Environment (3) of the configuration device (1), reading out or generating an RSA key complying with security standards via a SSH protocol for permitting access to the access control component, and transferring the RSA key, by the Trusted Execution Environment of the configuration device, to the access control component and subsequently verifying the RSA key, in a next step, reading-out or generating a password by the Trusted Execution Environment (3) of the configuration device (1), which is transferred by an encrypted connection to the access control component and checked by an automatic input of the password, subsequently creating and storing, outside the Trusted Execution environment (3) in the configuration device (1), a file containing all configuration information, after creating the file, terminating the connection between the configuration device (1) and the access control component, in a next step, establishing a connection for data communication between the configuration device (1) and the further computer (4), following mutual authentication, establishing a secure network connection via the further computer (4) to the server (5) and, following mutual authentication between the configuration device (1) and the server (5), transferring the password, the RSA key complying with the security standards and predefined parameters by the Trusted Execution Environment (3) of the configuration device (1) to the Trusted Execution Environment on the server (5), via the secure network connection, and after completion of the transfer, erasing the password, the RSA key, and the predefined parameters from the configuration device (1).

6. The method according to claim 5, further comprising transferring an executable file to a temporary memory of the access control component in order to transfer the predefined configuration to the access control component and entering a command for executing the executable file via the configuration device (1) by SSH network protocol via an emulated Ethernet port.

7. The method according to claim 5, further comprising effecting authentication between the configuration device (1) and the access control component by PGP encryption, and creating the RSA key of the configuration device (1) such that the RSA key loses its validity after a predefined period of time.

8. The method according to claim 5, further comprising using a USB stick as the configuration device (1).

* * * * *